US005891946A

United States Patent [19]
Nohara et al.

[11] Patent Number: 5,891,946
[45] Date of Patent: *Apr. 6, 1999

[54] PROPYLENE RESIN COMPOSITION INCLUDING ISOTACTIC POLYPROPYLENE AND POLYOLEFIN RESIN

[75] Inventors: Yasuhiro Nohara; Kazuyuki Watanabe, both of Oita, Japan

[73] Assignee: Showa Denko K.K., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 545,178

[22] Filed: Oct. 19, 1995

[30] Foreign Application Priority Data

Oct. 19, 1994 [JP] Japan .................................. 6-280022
Oct. 25, 1994 [JP] Japan .................................. 6-284139

[51] Int. Cl.$^6$ ................. C08K 3/26; C08K 3/34; C08K 3/18; G05L 53/00
[52] U.S. Cl. .............. 524/427; 524/451; 524/435; 524/442; 524/449; 524/528; 524/505; 525/88; 525/240
[58] Field of Search ...................... 525/88, 240; 524/427, 524/451, 505, 442, 449, 435, 528

[56] References Cited

U.S. PATENT DOCUMENTS

| | | |
|---|---|---|
| 4,363,885 | 12/1982 | Fukui et al. . |
| 5,302,653 | 4/1994 | Nishio et al. . |
| 5,563,194 | 10/1996 | Watanabe et al. . |

FOREIGN PATENT DOCUMENTS

| | | |
|---|---|---|
| 0265075 | 4/1988 | European Pat. Off. . |
| 0462373A2 | 12/1991 | European Pat. Off. . |
| 0538749A1 | 4/1993 | European Pat. Off. . |
| 0651010A1 | 5/1995 | European Pat. Off. . |
| 59-165654 | 9/1984 | Japan . |
| 603420 | 1/1985 | Japan . |
| 4275351 | 9/1992 | Japan . |
| 55051 | 1/1993 | Japan . |
| 598097 | 4/1993 | Japan . |
| 598098 | 4/1993 | Japan . |

OTHER PUBLICATIONS

"Hawley's Condensed Chemical Dictionary", 12t ed., Lewis ed., Van Nostrand Reinhold Co., New York, p. 1219 (1993).

Billmeyer, "Textbook of Polymer Science", 2nd ed., Wiley–Interscience, New York, pp. 174–175 (1962).

Primary Examiner—Donald R. Wilson
Attorney, Agent, or Firm—Sughrue, Mion, Zinn, Macpeak & Seas, PLLC

[57] ABSTRACT

A resin mixture including a composition containing polypropylene that includes a portion insoluble in xylene, an isotactic pentad fraction of not less than 96.5% and an isotactic average chain length of not less than 90, 45~70 parts by weight; a polyolefin resin, 5~20 parts by weight; an inorganic filler selected from precipitated calcium carbonate, hydrated silicic acid, and hydrated calcium silicate, 5~30 parts by weight; and an inorganic filler selected from talc, mica, and potassium titanate, 5~30 parts by weight; is superior in scratch resistance, moldability, and balance of rigidity and impact resistance. In addition, a laminate having a layer of this mixture has superior gloss. This mixture and the laminate are useful in automobile parts, electric and electronic parts, packaging materials, etc.

6 Claims, 4 Drawing Sheets

NOMENCLATURE FOR CARBONS DERIVED
FROM CHAIN DISTRIBUTIONS (S=METHYLENE, T=METHINE, P=METHYL)

PROPYLENE RESIN COMPOSITION INCLUDING ISOTACTIC POLYPROPYLENE AND POLYOLEFIN RESIN

BACKGROUND OF THE INVENTION

1. Field of the Invention

The present invention relates to a propylene resin composition and molded articles thereof which are superior in scratch resistance, moldability, and balance of rigidity and impact resistance; and which are suited for use in electric and electronic parts, packaging materials, engineering plastic substitutes, etc.

Furthermore, the present invention relates to a propylene resin laminate which has, in addition to the above properties, a superior gloss.

2. Background Art

Propylene is widely used, for example, in industrial materials for vehicle parts, electric and electronic parts, etc., and in various packaging materials, since it is generally inexpensive, and has the advantages of light-weight characteristics, mechanical strength, heat resistance, chemical resistance, etc.

In recent years, there has been a strong demand for improvements in quality along with increased functionality and reduced costs for these materials.

In addition, there is the problem that the surface gloss of goods is degraded by heating during secondary molding by means of vacuum forming and the like, and therefore use is limited.

As ways to improve the rigidity, impact resistance, heat resistance, etc., of polypropylene, methods have been proposed such as incorporating an ethylene-propylene rubber and a nucleating agent into an ethylene-propylene block copolymer (Japanese Patent Application, Second Publication, No. Sho 60-3420), and incorporating an ethylene-propylene rubber, an ethylene copolymer, and an inorganic filler into an ethylene-propylene block copolymer (Japanese Patent Application, First Publication, No. Hei 4-275351, Japanese Patent Application, First Publication, No. Hei 5-5051, Japanese Patent Application, First Publication, No. Hei 5-98097, Japanese Patent Application, First Publication, No. Hei 5-98098).

In addition, in order to improve the gloss of secondarily molded articles, a laminate comprising a polyolefin composition layer and a surface layer to which organic or inorganic fillers have been added has been proposed (Japanese Patent Application, First Publication, No. Sho 59-165654).

However, in the above-mentioned methods, although some characteristics have been improved, heat resistance and rigidity still have not been adequately improved. In addition, there is the problem that moldability for vacuum forming and the like is inferior. Furthermore, a satisfactory level for the gloss of secondarily molded articles has not been reached.

SUMMARY OF THE INVENTION

In view of the above, it is a first object of the present invention to provide a propylene resin composition and molded articles thereof which are superior in scratch resistance, moldability, balance of rigidity and impact resistance, etc.

In addition, it is a second object of the present invention to provide a propylene resin laminate having superior gloss in addition to the above properties.

The inventors, through long and careful research, have discovered that the above-mentioned first object can be achieved by a propylene block copolymer having specific properties. The inventors discovered that the above-mentioned second object can be achieved by using the above-mentioned propylene copolymer together with polyolefin. The present invention is based on these discoveries and completely achieves these objects.

More specifically, a first aspect of the present invention provides a propylene resin composition comprising (A) a composition containing a polypropylene, 45~70 parts by weight, the polypropylene having the following physical characteristics (i) to (iv):
  (i) a portion insoluble in xylene at 25° C. by solvent extraction method of not less than 98.0% by weight;
  (ii) an isotactic pentad fraction of not less than 96.5%;
  (iii) an isotactic average chain length of not less than 90; and
  (iv) a total amount of fractions each of which has an isotactic average chain length of not less than 300, according to a column fractionation method, of not less than 10% by weight;

(B) a polyolefin resin, 5~20 parts by weight, the polyolefin having the following physical characteristics (v) to (vii):
  (v) a ratio of $\eta_1/\eta_2$ of 4~20, wherein $\eta_1$ is a complex viscosity at a frequency of $10^{-1}$ rad/sec at 190° C., and $\eta_2$ is a complex viscosity at a frequency of 10 rad/sec at 190° C.;
  (vi) Tcp of 110°~130° C., a ratio of Tmp to Tcp (Tmp/Tcp) of 1.1~1.5, and Tmp/(Tmp-Tcp) of 3.0~9.8, wherein Tcp is crystallization peak temperature, and Tmp is melting peak temperature of the polyolefin resin according to a differential scanning calorimetry (DSC) method; and
  (vii) a crystal structure of an a-axis orientation in a diffraction pattern according to an X-ray diffraction method;

(C) at least one inorganic filler selected from the group consisting of precipitated calcium carbonate, hydrated silicic acid, and hydrated calcium silicate, 5~30 parts by weight; and (D) at least one inorganic filler selected from the group consisting of talc, mica, and potassium titanate, 5~30 parts by weight.

With regard to the above-mentioned first aspect of the present invention, composition (A) containing polypropylene can be a propylene block copolymer comprising (a) a polypropylene portion, 50~97 parts by weight, having the above-mentioned characteristics (i)~(v); and (b) a propylene-α-olefin copolymer portion, 3~50 parts by weight, comprising propylene with ethylene and/or an α-olefin of 4~12 carbons which satisfies all of the following conditions:
  (viii) an average propylene content (FP) of 20~80% by mole according to a two-site model;
  (ix) a propylene content ($P_P$) of 65~90% by mole in a copolymer ($P_H$) generated at an active site where polymerization of propylene predominantly occurs according to a two-site model;
  (x) a proportion of $P_H$ in the propylene-α-olefin copolymer of 0.40~0.80; and
  (xi) a block property (CSD: Copolymer Sequence Distribution) of 1.8~5.0.

In addition, in place of the above, composition (A) containing polypropylene used in the first aspect of the present invention can be a polypropylene having the above characteristics (i)~(iv). In this case, in addition to the above components (A)~(D), the propylene resin composition contains a rubber polymer (E) 3~15 parts by weight.

In addition, a second aspect of the present invention provides a propylene resin laminate comprising at least two layers: a polypropylene layer (Layer I) made by incorporating a dibenzylidenesorbitol derivative, 0.005~0.5% by weight, in a polypropylene, and a propylene resin composition layer (Layer II) comprising a propylene resin composition of the above-mentioned first aspect of the present invention.

The propylene resin composition of the present invention is superior in scratch resistance, moldability, and balance of rigidity and impact resistance. In addition, the propylene resin laminate of the present invention has, in addition to the above-mentioned properties, superior gloss. Consequently, both the propylene resin composition and the propylene resin laminate of the present invention are particularly useful in automobile parts, electric and electronic parts, packaging materials, etc.

DESCRIPTION OF THE PREFERRED EMBODIMENTS

In the first embodiment of the first aspect of the present invention, a composition (A) containing polypropylene is a propylene block copolymer (hereinafter referred to as "BPP") comprising a polypropylene portion (a), and a propylene-$\alpha$-olefin copolymer portion (b) of a propylene with ethylene and/or an $\alpha$-olefin. In the aforementioned BPP, it is essential that the polypropylene portion (a) which is generated by a first-step reaction have the following properties.

Specifically, a portion insoluble in xylene at 25° C. by solvent extraction method (this portion is hereinafter referred to as "xylene-extraction-insoluble portion"; the amount of the xylene-extraction-insoluble portion is hereinafter referred to as "XI") of at least 98.0% by weight, preferably at least 98.5% by weight, and more preferably 99.0% by weight. When XI is less than 98.0% by weight, rigidity and scratch resistance of the propylene resin composition are inferior. The determination of XI herein uses a method in which a polypropylene is dissolved in o-xylene at 135° C.; then, by cooling to 25° C., a polymer is precipitated.

It is essential that the isotactic pentad fraction (ii) (hereinafter referred to as "IP") be at least 96.5% by weight, preferably at least 96.8% by weight, and more preferably at least 97.0% by weight. When IP is less than 96.5% by weight, the heat resistance and rigidity properties of the propylene resin are inferior and undesirable.

In addition, IP is the isotactic fraction with respect to pentad units in a polypropylene molecular chain, which is determined from nuclear magnetic resonance with isotopic carbon ($^{13}$C-NMR) spectra. The method for this determination herein follows the method published in A. Zambelli; *Macromolecules,* 6,925 (1973), 8, 687 (1975), and 13, 267 (1980).

An isotactic average chain length (iii) (hereinafter referred to as "N") of at least 90, preferably of at least 100, and more preferably of at least 110, is necessary. When N is less than 90, the heat resistance and rigidity of the propylene resin composition are inferior.

N indicates an average length of isotactic portions with respect to methyl groups in a polypropylene molecule. The method for determining N herein follows the method described in J. C. Randall, *Polymer Sequence Distribution,* Academic Press, New York, 1977, Chapter 2.

Figure 1:
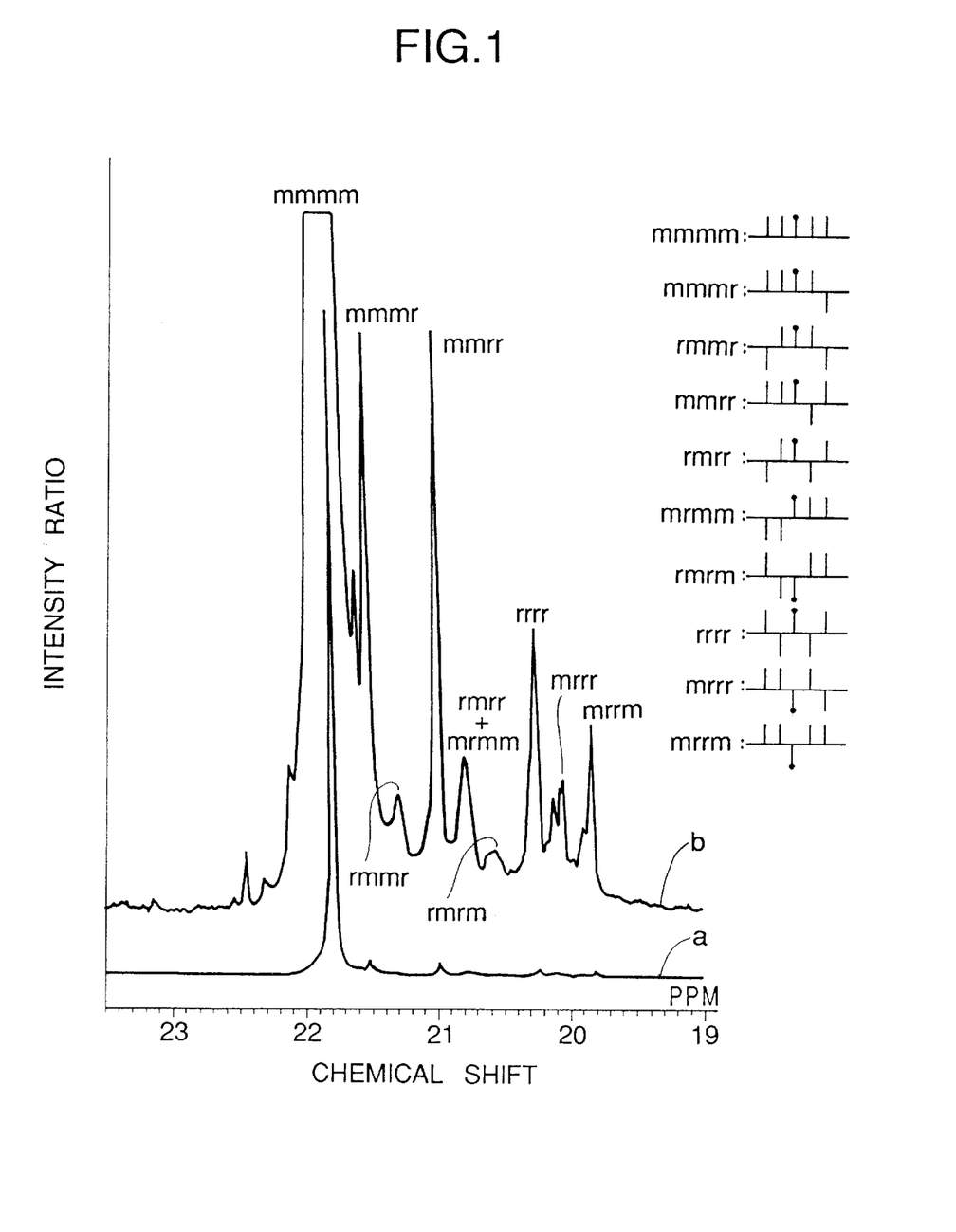
FIG. 1 shows a nuclear magnetic resonance spectrum for the methyl domain of a polypropylene.

In more detail, a polypropylene is dissolved in a 1,2,4-trichlorobenzene/benzene deuteride solvent mixture which is heated to 130° C. so that the polymer concentration is 10% by weight. This solution is put into a 10 mm diameter glass test tube and a $^{13}$C-NMR spectrum is taken using a method similar to that used for IP. This spectrum is shown in FIG. 1. In FIG. 1, "a" indicates the spectrum of the methyl group domain of the polypropylene, and "b" is an enlargement of the spectrum. The spectrum was obtained by pentad unit, i.e., by units of five adjacent methyl groups. The absorption peaks vary depending on the isotacticity (which consist of 10 structures: mmmm, mmmr, etc.) with respect to the methyl groups. In addition, "b" indicates the correspondence between the absorption peaks and the isotacticity.

Shan-Nong ZHU, et al., *Polymer Journal,* Vol. 15, No. 12, pp 859–868 (1983) describes the "bi-catalytic site model" as a polymerization theory. It proposes that, during polymerization, there are two kinds of active sites; a site on the catalyst side and a site at the end of a polymer; "catalyst-controlled polymerization" takes place on the catalyst side, while "chain end-controlled polymerization" takes place at the end of the polymer. (Details of this theory are described in Junji Furukawa; Macromolecule Essence and Topics 2, *Macromolecule Syntheses,* p. 73, published by Kagakudojin (1986).)

In conclusion, the bi-catalytic site model of the above-mentioned publication, in which $\alpha$ is the probability that in catalyst-controlled polymerization (enantiomorphic process), D and L will be added to the polymerization terminal; that is, an index of the degree of disorder within the isotactic sequence;

$\sigma$ is the probability that in chain end-controlled polymerization (Bernoullian process), a mesoisomer is formed in which a monomer of the same configuration as that of the polymerization terminal is added thereto; and $\omega$ is the proportion of a sites;

can theoretically be used to calculate the isotactic intensity of the 10 different kinds of isotacticity of the pentad unit.

In addition, $\alpha$, $\sigma$, and $\omega$, are calculated by least squares method so that the above-mentioned theoretical intensity and the above-mentioned NMR measured intensity agree. On the basis of the following equation, the mole fraction of each kind of pentad units is calculated.

TABLE 1

| | | |
|---|---|---|
| MESOISOMER | $A_1$ : mmmm | $= \omega (1 - 5\beta + 5\beta^2) + (1 - \omega) \sigma^4$ |
| | $A_2$ : mmmr | $= \omega (2\beta - 6\beta^2) + 2 (1 - \omega) \sigma^3 (1 - \sigma)$ |
| | $A_3$ : rmmr | $= \omega\beta^2 + (1 - \omega) \sigma^2 (1 - \sigma)^2$ |
| RACEMIC | $A_4$ : mmrr | $= \omega (2\beta - 6\beta^2) + 2 (1 - \omega) \sigma^2 (1 - \sigma)^2$ |

TABLE 1-continued

| STRUCTURE | |
|---|---|
| | $A_5$ : mmrm = $2\omega\beta^2 + 2(1-\omega)\sigma^3(1-\sigma)$ |
| | $A_6$ : rmrr = $2\omega\beta^2 + 2(1-\omega)\sigma(1-\sigma)^3$ |
| | $A_7$ : rmrm = $2\omega\beta^2 + 2(1-\omega)\sigma^2(1-\sigma)^2$ |
| | $A_8$ : rrrr = $\omega\beta^2 + 2(1-\omega)(1-\sigma)^4$ |
| | $A_9$ : mrrr = $\omega\beta^2 + 2(1-\omega)\sigma(1-\sigma)^3$ |
| | $A_{10}$: mrrm = $\omega(\beta - 3\beta^2) + (1-\omega)\sigma^2(1-\sigma)^2$ |

Provided that $\beta = \alpha(1-\alpha)$.

Next, the average chain length (N) can be determined by applying the above result to the following defining equation described in the above-mentioned Randall publication:

$$N = \frac{\text{the number of meso diad sequences}}{\text{the number of meso diad units}}$$

In practice, N can be determined according to the following equation.

$$N = 1 + (A1 + A2 + A3)/0.5(A4 + A5 + A6 + A7)$$

Furthermore, according to the physical property (iv) of the polypropylene (A), it is essential that the total amount of fractions each of which has an isotactic average chain length (herein after referred to as "$N_f$") of not less than 300 according to a column fractionation method be at least 10% by weight of the whole, preferably 30% by weight of the whole, and more preferably at least 50% by weight of the whole. When the total amount of fractions each of which has $N_f$ of at least 300 is less than 10% by weight of the whole, the advantages of the improvement in rigidity, surface hardness, and heat resistance of the propylene resin composition are degraded.

Here, the column fractionation method is carried out by dissolving in p-xylene at 130° C. the above-mentioned xylene-extraction-insoluble portion; adding Celite to the solution; lowering the temperature at a rate of 10° C./hour until reaching 30° C. so as to allow the solution to adsorb to the Celite to form a slurry; filling a column with the Celite slurry; and obtaining different fractions of a polypropylene separately by using p-xylene as a developer and by raising the temperature, which is 30° C. at the beginning, by 2.5° C. at a time. This method is described in more detail in Masahiro Kakugo et al, *Macromolecules*, Vol. 21, pp 314–319 (1988). The $N_f$ of each fraction of the polypropylene is determined using the above-described method for determining N.

In addition, with regard to the BPP used in the present invention, it is essential that the propylene-α-olefin copolymer portion (b) produced by a second step reaction satisfy the following conditions according to analysis by the two-site model.

Figure 2:
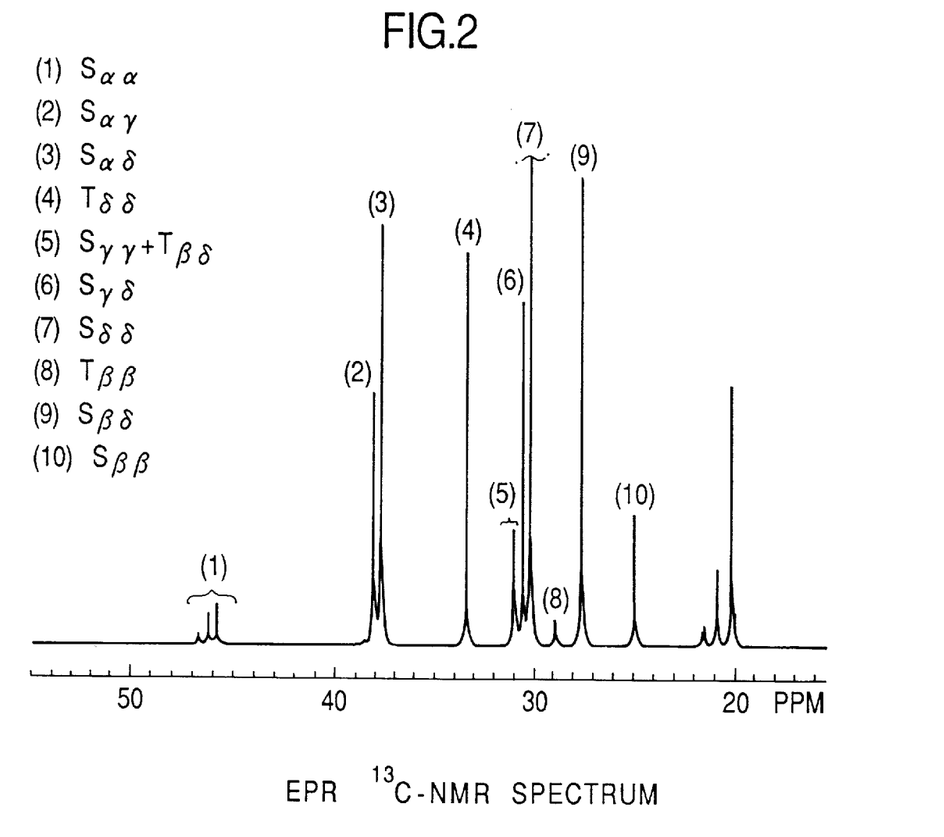
FIG. 2 shows a nuclear magnetic resonance spectrum of an ethylene-propylene copolymer.
Figure 3:
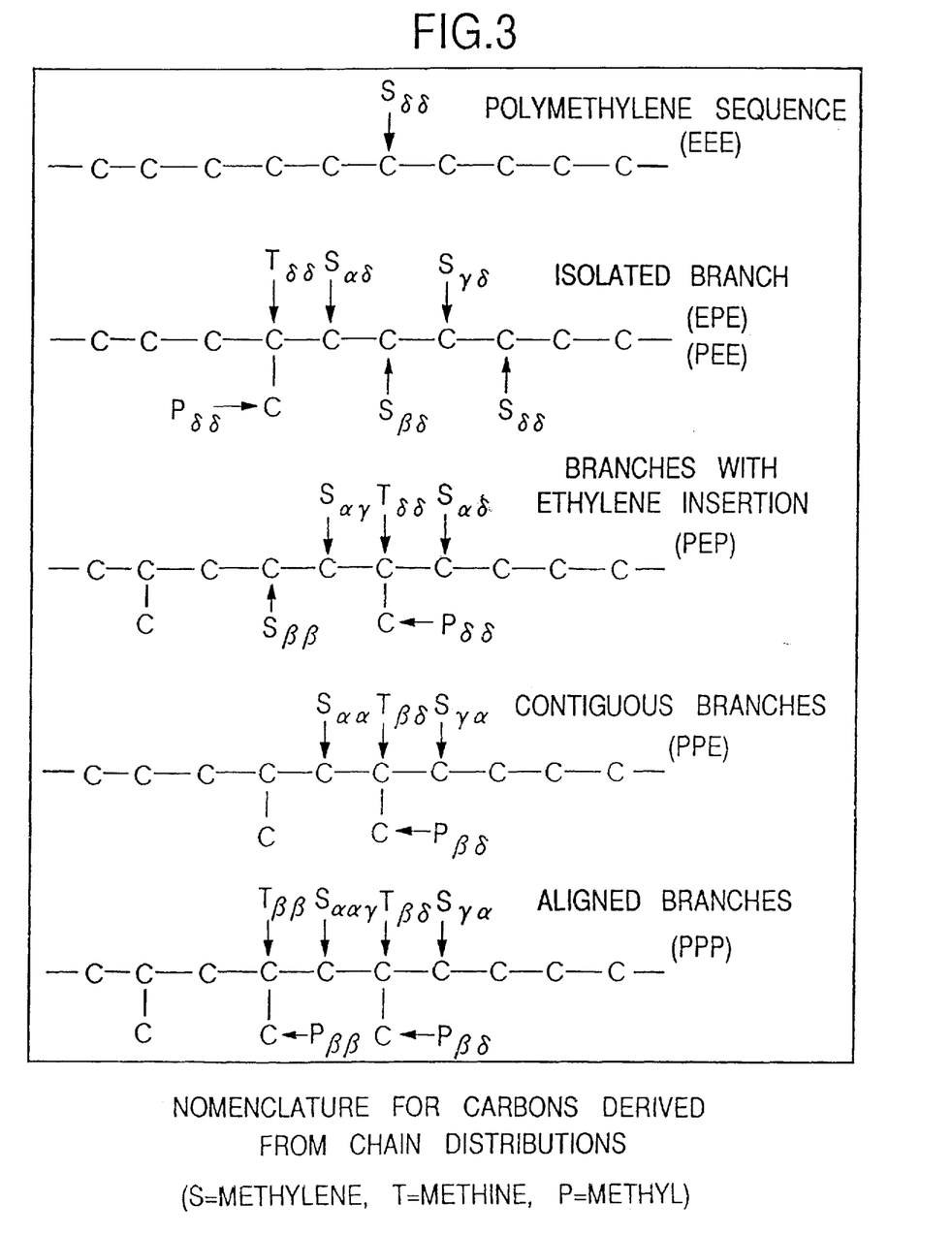
FIG. 3 shows nomenclature for carbons derived from chain distributions in a polyolefin.

In the following, the two-site model of the propylene-α-olefin copolymer will be explained taking propylene-ethylene copolymer as an example. FIG. 2 shows an example of the propylene-ethylene copolymer nuclear magnetic resonance with isotopic carbon ($^{13}$C-NMR) spectrum. In the aforementioned spectrum, the 10 peaks shown in (1) to (10) are revealed due to the difference in the chain distribution (the way in which the ethylene and propylene are lined up). The nomenclature for the chains is published in Carman, C. J. et al; *Macromolecules*, Vol. 10, pp. 536–544 (1977), and the names are shown in FIG. 3. By assuming copolymerization reaction mechanisms, these chains can be expressed in equations by using a reaction probability P. When the total peak strength is made 1, the relative strength of each peak (1)~(10), can be obtained from the probability equation by means of Bernoulli statistics using P as a parameter.

For example, supposing that "p" indicates propylene while "e" indicates ethylene, chains which may exhibit peaks for Sαα (1) are 3 kinds of chains, [pppp], [pppe], and [eppe]. Each of these chains is expressed in equations by using reaction probability P, and then the equations are totaled. As for the remaining peaks (2) to (10), equations are built up using the same method. P is obtained by finding the optimal value therefor which makes the results of these 10 equations closest to the actually measured peak strengths.

The two-site model, which is applied for the assumption of these reaction mechanisms, is disclosed in H. J. Cheng; Journal of Applied Polymer Science, Vol. 35, pp. 1639–1650 (1988). With regard to this model which uses a catalyst to copolymerize propylene and ethylene, by assuming both the propylene content ($P_P$) of the copolymer ($P_H$) generated at an active site where polymerization of propylene predominantly occurs, and the propylene content ($P'_P$) of the copolymer generated at an active site where polymerization of ethylene predominantly occurs, and by applying the proportion ($P_{fl}$) of $P_H$ in the copolymer as a parameter, the probability equations shown in the following Table 2 are obtained.

TABLE 2

| Signal | Probability Equations of the Two-Site Model |
|---|---|
| (1) Sαα | $P_p^2 \times P_{fl} + P'^2_p \times (1 - P_{fl})$ |
| (2) Sαγ | $(-2P_p^3 + 2P_p^2) \times P_{fl} + (-2P'^3_p + 2P'^2_p) \times (1 - P_{fl})$ |
| (3) Sαδ | $(2P_p^3 - 4P_p^2 + 2P_p) \times P_{fl} + (2P'^3_p - 4P'^2_p + 2P'_p) \times (1 - P_{fl})$ |
| (4) Tδδ | $(P_p^3 - 2P_p^2 + P_p) \times P_{fl} + (P'^3_p - 2P'^2_p + P'_p) \times (1 - P_{fl})$ |
| (5) Sγγ + Tβδ | $(P_p^4 - 4P_p^3 + 3P_p^2) \times P_{fl} + (P'^4_p - 4P'^3_p + 3P'^2_p) \times (1 - P_{fl})$ |
| (6) Sγδ | $(-2P_p^4 + 6P_p^3 - 6P_p^2 + 2P_p) \times P_{fl} + (-2P'^4_p + 6P'^3_p - 6P'^2_p + 2P'_p) \times (1 - P_{fl})$ |
| (7) Sδδ | $(P_p^4 - 5P_p^3 + 9P_p^2 - 7P_p + 2) \times P_{fl} + (P'^4_p - 5P'^3_p + 9P'^2_p - 7P'_p + 2) \times (1 - P_{fl})$ |
| (8) Tββ | $P_p^3 \times P_{fl} + P'^3_p \times (1 - P_{fl})$ |
| (9) Sβδ | $(2P_p^3 - 4P_p^2 + 2P_p) \times P_{fl} + (2P'^3_p - 4P'^2_p + 2P'_p) \times (1 - P_{fl})$ |
| (10) Sββ | $(-P_p^3 + P_p^2) \times P_{fl} + (-P'^3_p + P'^2_p) \times (1 - P_{fl})$ |

So that the above-mentioned relative strength of the $^{13}$C-NMR spectrum and the probability equations shown in Table 2 are in agreement, optimal values for the three parameters, $P_P$, $P'_P$ and $P_{fl}$, can be found.

The average propylene content (FP) specified in the present invention is calculated by means of the following equation using the above-mentioned three parameters.

$$FP = P_P \times P_{fl} + P'_P \times (1 - P_{fl}) \text{ (\% by mole)}$$

FP which is obtained by the above equation should be 20~80% by mole, preferably 25~75% by mole, and more preferably 30~70% by mole (this is condition (viii) of the present invention). When FP is less than 20% by mole, the external appearance of the molded articles is remarkably degraded. However, an FP exceeding 80% by mole is not desirable, because when FP exceeds 80% by mole, impact resistance is degraded.

In addition, $P_P$ from among the parameters above should be 65~90% by mole, preferably 68~88% by mole, and more preferably 70~85% by mole (this is condition (ix) of the present invention). When $P_P$ is less than 65% by mole rigidity and heat resistance are degraded. On the other hand, it is not desirable for $P_P$ to exceed 90% by mole, because when $P_P$ exceeds 90% by mole, impact resistance is degraded.

In addition, $P_{fl}$ should be 0.40~0.80, preferably 0.45~0.75, and more preferably 0.48~0.72 (this is condition (x) of the present invention). When $P_{fl}$ is less than 0.40, rigidity and heat resistance are degraded. On the other hand, it is not desirable for $P_{fl}$ to exceed 0.80, because when $P_{fl}$ exceeds 0.80, impact resistance is degraded.

Finally, the block property (CSD: Copolymer Sequence Distribution) is the reactivity ratio of ethylene and propylene; this method is defined in "Kyojugo 1, Hanno Kaiseki" (Copolymerization 1, Reaction Analysis), PP. 5–13, edited by Kobunshi Kai (Macromolecule Society), published by Baifukan (1975). That is, CSD is expressed by the following equation using the intensity ratio (Ri) of each peak in the spectrum of FIG. 2.

$$CSD=(R4\times R1)/[0.5\times(R2+R3)]^2$$

The CSD obtained by the above equation should be 1.8~5.0, preferably 2.0~4.5, and more preferably 2.5~4.0 (this is condition (xi) of the present invention). When CSD is less than 1.8, rigidity and heat resistance are degraded. On the other hand, it is not desirable for CSD to exceed 5.0, because when CSD exceeds 5.0, impact resistance at low temperatures is degraded.

The proportion of the propylene-α-olefin copolymer portion (b) in the BPP used in the present invention should be 3~50 parts by weight, preferably 5~45 parts by weight, and more preferably 10~40 parts by weight. When the proportion of (b) is less than 3 parts by weight, the impact resistant strength is degraded. However, it is not desirable for the proportion of (b) to exceed 50 parts by weight, because when the proportion exceeds 50 parts by weight, rigidity and heat resistance are inhibited.

The polymerization for the BPP used in the present invention takes place at a temperature of from room temperature to 130° C., and preferably from 50° to 90° C., and under a pressure of 2~50 kg/cm² by means of a gas phase polymerization method without using a solvent; a slurry method which takes place in the presence of a liquefied α-olefin solvent, such as propylene, or an inert hydrocarbon, such as hexane, heptane, and kerosene; or the like. As for the reactor in the polymerization process, a reactor like those usually used in this technical field can be used suitably; for example, any of an agitating vessel reactor, a fluidized-bed reactor, and a circulating reactor can be used in accordance with any of a continuous method, a semi-batch method, or a batch method can be used. In particular, BPP can be obtained by using a commonly-known multi-step polymerization method. That is, after propylene has been polymerized by means of a first step reaction, a method is carried out in which propylene and α-olefin are copolymerized by means of a second step reaction, for example, such as published in U.S. Pat. Nos. 4,576,994, 4,761,461, and 4,337,326.

The BPP used in the present invention cannot be obtained by the commonly-known Ziegler-Natta type catalyst, for example titanium trichloride type catalyst, or a titanium catalyst carrying magnesium chloride. As an example of a catalyst which can yield the BPP used in the present application, a modified polymerization catalyst can be mentioned, which is obtained by: treating a solid catalyst containing a magnesium compound, a titanium compound, a halogen containing compound, and an electron donative compound as its essential components with a titanium compound of general formula $TiX_a \cdot Y_b$ (wherein X is a halogen atom selected from the group consisting of Cl, Br, and I, Y is an electron donative compound, a is an integer of 3 or 4, and b is an integer of 3 or less); then washing the treated catalyst with a halogen-containing compound; and then further washing it with a hydrocarbon.

$TiX_a$ of the above-mentioned formula is known as a general electron donative compound which can easily form into a complex, as disclosed in, for example, R. S. P. Coutts, et al, Advan. Organometal. Chem., 9, 135 (1970); Shin Jikken Kagaku Koza (New Experimental Chemistry Course), Fourth Edition, 17, Muki Sakutai Kireto Sakutai (Inorganic Complexes and Chelate Complexes), Nippon Kagaku Kai (Japan Chemistry Society), Maruzen, (1991) p. 35; H. K. Kakkonen, et al, J. Organomet. Chem., 453, 157, (1993); and so on.

X is a halogen atom of Cl, Br, or I, and from among this group, Cl is preferable. a is 3 or 4, but preferably 4. As Y, generally an oxygen-containing compound, a nitrogen-containing compound, a phosphorous-containing compound, a sulfur-containing compound, and the like, can be mentioned. As an oxygen-containing compound, for example, alcohols, ethers, esters, acid halides, acid anhydrides, and the like can be mentioned. It is possible to use one type of these electron donative compounds, or two or more types of these electron compounds together. From within these, esters are preferable, and phthalic acid esters are especially preferable. With regard to b of Y, when the aforementioned a is 3, b may be 1~3; when a is 4, b is preferably 1 or 2; and the arrangement of a being 4 and b being 1 is particularly preferable.

The polyolefin resin (B) used in the present invention is a polyethylene, polypropylene, ethylene-propylene random copolymer, a copolymer of ethylene and α-olefin of 4~12 carbons, an ethylene-butene-propylene three-component copolymer, or the like.

With regard to the polyolefin resin used in the present invention, when the complex viscosity at a frequency of $10^{-1}$ rad/sec is $\eta_1$, and the complex viscosity at a frequency of 10 rad/sec is $\eta_2$, it is essential that, at a temperature of 190° C., the ratio of $\eta_1/\eta_2$ be 4~20 (this is condition (v) of the present invention). A value for $\eta1/\eta2$ of 4~15 is preferable, and 5~15 is particularly preferable. When $\eta1/\eta2$ is less than 4, anisotropy becomes greater and the M.D/T.D balance becomes poor. On the other hand, when $\eta1/\eta2$ exceeds 20, gelation or fish eyes easily appear, and the value of the goods decreases and this is not desirable.

Complex viscosity is viscoelastic behavior of an object which is observed when the object is transformed or receives an external force vibrationally (at an angular frequency). The measuring method is disclosed in, for example, Koza.Rheology (Course in Rheology), pp. 78–119, edited by Nippon Rheology Gakkai (Japan Rheology Society), published by Kobunshi Kanko Kai (Macromolecule Publication Association), 1992.

In addition, with regard to the polyolefin resin of the present invention, according to differential scanning calorimetry (DSC), where the melting peak temperature is Tmp and the crystallization peak temperature is Tcp; the Tcp should be 110°~130° C.; the ratio of Tmp to Tcp (Tmp/Tcp) should be 1.1~1.5; and Tmp/(Tmp-Tcp) must be 3.0~9.8 (this is condition (vi) of the present invention). Tcp is preferably 112°~127° C., and more preferably 113°~125° C. When Tcp is less than 110° C., mechanical strength anisotropy increases. On the other hand, when Tcp exceeds 130° C. mechanical strengths, such as impact strength, are unsatisfactory, and this is not desirable.

When Tmp/Tcp is less than 1.1, flexibility and impact strength are unsatisfactory. On the other hand, when Tmp/Tcp exceeds 1.5, mechanical strength anisotropy arises and balance is poor.

When Tmp/(Tmp-Tcp) is less than 3, mechanical strength anisotropy arises. On the other hand, when Tmp/(Tmp-Tcp)

exceeds 9.8, flexibility and impact strength is degraded, and this is not desirable.

The DSC measuring method of Tmp and Tcp follows.

For the polyethylene resin, Tcp is measured by raising the temperature to 190° C. and maintaining it for 5 minutes, then lowering it at a rate of 10° C./minute until it falls to 30° C.; and Tmp is measured by raising the temperature again at a rate of 10° C./minute to 190° C. In addition, for the propylene resin, Tcp is measured by raising the temperature to 230° C. and maintaining it for 5 minutes, then lowering it at a rate of 20° C./minute until it falls to 30° C.; and Tmp is measured by raising the temperature again at a rate of 20° C./minute to 230° C.

In addition, it is essential that the polyolefin resin used in the present invention have the crystal structure of an a-axis orientation in the diffraction pattern produced using an X-ray diffraction method (this is condition (vii) of the present invention). There are many studies into crystal structure analysis by means of X-ray diffraction methods for polyolefin, for example, "Kobunshi" (Macromolecules), Vol. 14, No. 158, pp. 379–388; "Nippon Kagaku Kai Shi" (Japan Chemistry Society Journal), Vol. 82, No. 12, pp. 1575–1577; and the like.

Figure 4:
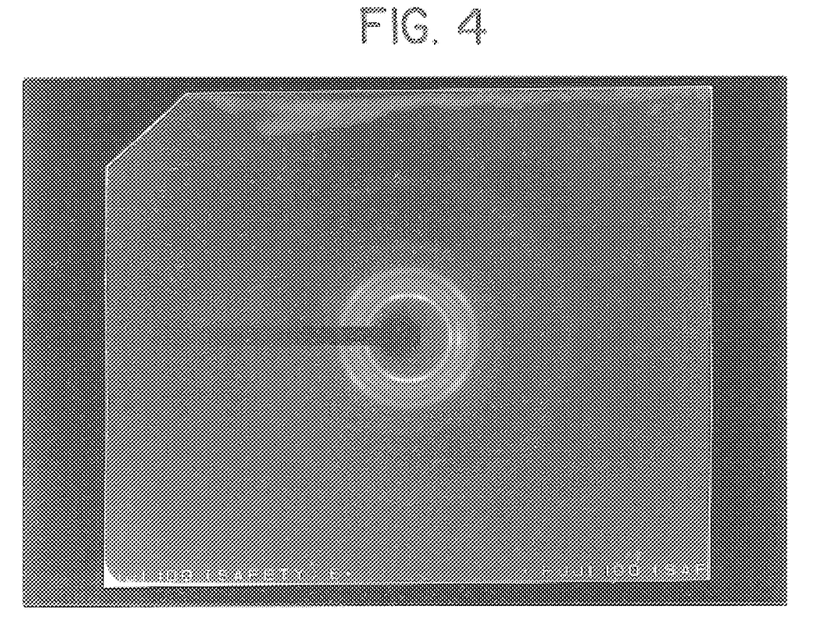
FIG. 4 shows an example of an X-ray diffraction image of a polypropylene having an a-axis orientation.
Figure 5:
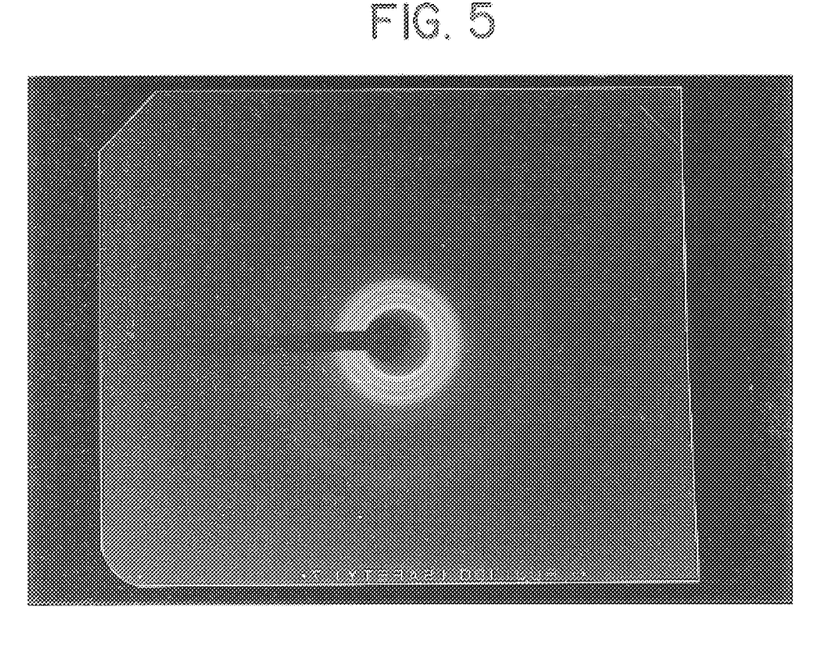
FIG. 5 shows an example of an X-ray diffraction image of a polypropylene which does not have an a-axis orientation.

FIG. 4 is an example X-ray diffraction pattern of the polypropylene having an a-axis orientation, the vertical direction corresponds to the direction (M.D.) in which the film is drawn out. In this pattern, the direction of the meridian corresponds to the a-axis, and a diffraction image showing orientation in this direction (a pair of the upper and lower white lines of the horizontal direction) is clearly revealed. On the other hand, FIG. 5 is an example of a polypropylene which does not have the a-axis orientation; because there is no orientation in the crystals the diffraction image exhibits a ring pattern. When this kind of polyolefin resin which does not have an a-axis orientation is used, improved results in moldability cannot be achieved.

Specific examples of the polyolefin resin which can be used in the present invention are a polypropylene which is treated by radiation of an ionizing beam, such as an electron beam or gamma rays, in a vacuum or an inert atmosphere; a polypropylene prepared by using a porous δ titanium trichloride as a catalyst; and a high density polyethylene prepared by using a solid catalyst prepared by calcinating at a high temperature a carrier made of silica or alumina carrying an oxide of a transition metal such as chromium and molybdenum.

Among these polyolefin resins, those which have a melt tension at 230° C. of 10 g or greater are preferable in terms of the moldability.

Component (C) used in the present invention is at least one type of inorganic filler selected from the group consisting of precipitated calcium carbonate, hydrated silicic acid, and hydrated calcium silicate, and, from within this group, precipitated calcium carbonate is preferable. The average particle size of the filler should usually be less than 4 $\mu$m, preferably of about 1 $\mu$m, and most preferably 0,5~1 $\mu$m.

In addition, Component (D) is at least one type of inorganic filler selected from the group consisting of talc (magnesium silicate), mica, and potassium titanate. From within this group, talc is preferable.

The above-mentioned fillers may be treated before use with a fatty acid ester, a metallic salt of a fatty acid, a fatty acid, a coupling agent such as an organic titanate or aluminium, or the like. In addition, a denatured polypropylene may be added, which is graft-treated by means of an organic peroxide as well as an unsaturated carboxylic acid or its anhydride represented by maleic anhydride, acrylic acid, itaconic acid, and the like.

The proportion of component (A) in the resin composition of the present invention is 45~70 parts by weight, preferably 48~67 parts by weight, and more preferably 50~65 parts by weight. When the proportion of component (A) is less than 45 parts by weight, the rigidity, scratch resistance, and moldability are degraded. On the other hand, when the proportion of component (A) exceeds 70 parts by weight, impact resistance is degraded and this is not desirable.

The proportion of component (B) in the composition is 5~20 parts by weight, preferably 7~18 parts by weight, and more preferably 9~16 parts by weight. When the proportion of component (B) is less than 5 parts by weight, moldability is inferior. On the other hand, when the proportion of component (B) exceeds 20 parts by weight, the exterior of molded articles deteriorates, and this is not desirable.

The proportion of component (C) in the composition is 5~30 parts by weight, preferably 8~28 parts by weight, and more preferably 10~25 parts by weight. When the proportion of component (C) is less than 5 parts by weight, impact resistance is degraded. On the other hand, when the proportion of component (C) exceeds 30 parts by weight, moldability is inferior, and impact resistance is degraded, and this is not desirable.

In addition, the proportion of component (D) in the composition is 5~30 parts by weight, preferably 6~25 parts by weight, and more preferably 7~20 parts by weight. When the proportion of component (D) is less than 5 parts by weight, rigidity is degraded. On the other hand, when the proportion of component (D) exceeds 30 parts by weight, moldability is degraded and this is not desirable.

In addition, in the second embodiment of the first aspect of the present invention, in place of the BPP used in the above-mentioned first embodiment, the composition (A) is a polypropylene (hereinafter referred to as PP) which has the above-mentioned characteristics (i)~(iv) is used. This PP may be a propylene homopolymer as well as a random or block copolymer of propylene with ethylene and/or $\alpha$-olefin of 4~12 carbons. As an $\alpha$-olefin, 1-butene, 4-methyl-1-pentene, 1-hexane, 1-octane, and the like can be mentioned.

The polymerization for the PP used in this second embodiment can be carried out in line with the same method used for the BPP of the first embodiment, using the same catalyst.

Moreover, the preferable ranges of the characteristics (i)~(iv) for the second embodiment are, for the same reasons, the same as the ranges for the first embodiment. In addition, the measurement of characteristics (i)~(iv) are performed in the same way as for the polypropylene portion (a) of the BPP (A) used in the first embodiment.

Furthermore, in addition to components (A)~(D), the propylene resin composition of this second embodiment contains a rubber polymer (E) 3~15 parts by weight.

This rubber polymer (E) is not particularly limited, and examples such as the following can be suggested: a natural rubber, a butadiene rubber, an isoprene rubber, a chloroprene rubber, a hydrogenated styrene-butadiene rubber, a styrene-ethylene/butene-styrene block copolymer, a hydrogenated styrene-isoprene rubber, a hydrogenated styrene-ethylene/isoprene-styrene block copolymer, an acrylic rubber, butyl rubber, an ethylene-propylene rubber, an ethylene-propylene-unconjugated diene rubber, and a hydrogenated ethylene-butadiene rubber. From within these examples, an ethylene-propylene rubber, a hydrogenated ethylene-butadiene rubber, a styrene-ethylene/butene-styrene block copolymer, and a hydrogenated styrene-ethylene/isoprene-styrene block copolymer are preferable.

Moreover, in this second embodiment, components (B)~(D) are selected in the same way as in the first embodiment.

In addition, in the propylene resin composition of the present invention, nucleating agents which are commonly used in the this technical field can be used. Examples of a nucleating agent are a metallic salt of a carboxylic acid, a dibenzylidenesorbitol derivative, a metallic salt of a phosphate, talc, and calcium carbonate. Specific examples are sodium benzoate, aluminium adipate, aluminium salt of p-t-butylbenzoic acid, sodium thiophenecarboxylate, 1,3,2,4-dibenzylidenesorbitol, 1,3,2,4-di(p-methylbenzylidene)sorbitol, 1,3-p-chlorobenzylidene-2,4-p-methylbenzylidenesorbitol, potassium bis(4-t-butylphenyl) phosphate, and sodium 2,2-ethylidenebis(4,6-t-butylphenyl) phosphate. It is possible to use only one of these nucleating agents, or to use two or more of these nucleating agents together.

The amount of nucleating agent added is generally 0.05~0.5 parts by weight, preferably 0.08~0.4 parts by weight, and more preferably 0.1~0.35 parts by weight.

In order to obtain the resin composition of the present invention, all the components are mixed according to a commonly-known method such as a method using a ribbon blender, a tumbler, a Henschel mixer, or the like; and then the mixture is melt-mixed by using a kneader, mixing roll, banbury mixer, extruder, or the like. A suitable temperature for the melt-mixing is usually 170°~280° C., and preferably 190°~260° C. The obtained composition can be molded into films, sheets, tubes, bottles, or the like, by a commonly-known method such as a melt molding method or a compression molding method. The molded article can be used alone, or it can be used in a laminated body with another material being laminated together therewith. Moreover, as will be explained below, the second aspect of the present invention is an example of a particularly good laminate.

As a lamination method, a so-called dry lamination method, in which a propylene resin composition according to the present invention is laminated with another thermoplastic resin using an adhesive, such as that of polyurethane, polyester, or polyacrylic, as well as a co-extrusion lamination method, a co-extrusion method, a co-injection molding method, a co-extrusion pipe molding method, and the like can be mentioned. A molded article can also be formed from the thus-obtained multilayered laminate by reheating and stretching in line with a molding method such as vacuum forming, pressure forming, stretch blow molding, and the like.

Furthermore, any additive used by one having ordinary skill in the art, such as an antioxidant, a weatherproof stabilizer, an anti-static agent, a lubricant, an antiblocking agent, an anti-fogging agent, a pigment, a plasticizer, a flexibilizer, or the like, may be arbitrarily incorporated into the propylene resin composition of the present invention, as long as the addition of the additive does not obstruct the above-mentioned objects of the present invention.

Next, the polypropylene resin laminate of the second aspect of the present invention will be explained.

The polypropylene layer (Layer I) in the laminate of the present invention, is a composition incorporating a dibenzylidenesorbitol derivative, 0.005~0.5% by weight, in polypropylene. The type of polypropylene is not particularly limited, and propylene homopolymers, random or block copolymers of propylene with another α-olefin, and the like can be mentioned; a polypropylene having an isotactic pentad portion of 98.0% or greater, what is called high stereoregularity, is preferable.

The dibenzylidenesorbitol derivative can be chosen from those widely used as nucleating agents in crystalline resins. Preferred examples of a dibenzylidenesorbitol derivative are 1,3,2,4-dibenzylidenesorbitol, 1,3,2,4-di(p-methylbenzylidene)sorbitol, and 4-p-methylbenzylidenesorbitol. The quantity of these sorbitols incorporated is, with regard to the polypropylene, 0.05~0.5% by weight, preferably 0.08~0.4% by weight, and more preferably 0.1~0.35% by weight. When the amount of sorbitol incorporated is less than 0.05% by weight, gloss is degraded. On the other hand, when the amount of sorbitol incorporated exceeds 0.5% by weight, lumps are produced in molded articles, the external appearance is inferior, and this is not desirable.

In addition, in Layer II of the propylene resin laminate of the present invention, any of the propylene resin compositions of the above-mentioned first aspect of the present invention can be used.

The resin composition which makes up Layer I is obtained by means of a commonly-known mixing method, such as the mixing method which can be employed for the resin composition making up Layer II in line with the first aspect of the present invention.

The thickness of Layer I in the laminate of the present invention, with regard to the total thickness of both Layer I and Layer II together, is preferably within the range of 0.05~20%, and more preferably within the range of 0.1~15%.

In addition, any additive used by one having ordinary skill in the art, such as those additives which can be used in the resin composition making up Layer II in line with the first aspect of the present invention, may be arbitrarily incorporated into the resin composition which makes up Layer I, as long as the addition of the additive does not obstruct the above-mentioned objects of the present invention.

EXAMPLES

In the following, the present invention is explained in more detail by means of examples.

A. Resin Composition which uses BPP

The measuring method for each property is shown below.

MFR

Melt Flow Rate (MFR) is measured by means of a melt indexer (manufactured by Takara K. K.) at a temperature of 230° C. and a load of 2.16 kg in accordance with JIS K7210, which closely corresponds with ASTM D1238.

Flexural Modulus

Flexural modulus is measured in accordance with JIS K7203, which closely corresponds with ASTM D790.

Izod Impact Strength

Izod impact strength is measured with test pieces having a notch in conformity with JIS K7110, which closely corresponds with ASTM D256.

Scratch Resistance

Scratch resistance is measured using a surface measuring machine (manufactured by HEIDON CO., 14S/D). A vertical load is applied by means of a cone shaped needle (made from sapphire, a JIS K6719 standard good) to a test piece (150×80 mm, thickness 0.5 mm) and the smallest load required to scratch the surface is measured.

In addition, in order to evaluate moldability, the following two tests are conducted.

Shape Maintenance Time

A fixed sheet in a frame (400×400 mm) is placed in an oven heated to 200° C. The once lowered sheet is again returned to its original position and the length of time that it maintains that condition is measured. The longer the shape maintenance time the more superior the moldability in general.

Uniform Spreadability

A sheet which has been kept in an oven heated to 230° C. for 30 seconds is vacuum molded using a box-shaped mold (size of opening: 300×200 mm, size of bottom: 280×180 mm, depth: 100 mm); and then, based on visual observations of the presence or absence of unevenness in thickness and the occurrence of wrinkles in the molded article, uniform spreadability is judged as good or poor.

The manufacture process for the BPP used in component (A) is shown below.

(1) Preparation of Solid Catalyst 56.8 g of anhydrous magnesium chloride were completely dissolved in a liquid mixture of 100 g of anhydrous ethanol, 500 ml of Vaseline oil (CP15N; manufactured by IDEMITSU KOHSAN CO., LTD.), and 500 ml of silicone oil (KF96; manufactured by SHINETSU SILICONE CO.), at 120° C. in nitrogen atmosphere. This mixture was stirred at 3000 r.p.m. for 3 minutes at 120° C. using a TK Homomixer manufactured by TOKUSHU KIKA KOGYO CO. Next, while maintaining the stirring and while cooling, the mixture was transferred into 2 liters of anhydrous heptane in such a manner that the anhydrous heptane was kept at 0° C. or lower. The obtained white solid was thoroughly washed with anhydrous heptane and vacuum-dried at room temperature.

30 g of the obtained white solid were suspended in 200 ml of anhydrous heptane, and while stirring, 500 ml of titanium tetrachloride were added dropwise over a one hour period. Next, the mixture was heated. When the temperature reached 40° C., 4.96 g of diisobutyl phthalate were added. The mixture was further heated to 100° C. over about an hour. Next, after the mixture was allowed to react at 100° C. for 2 hours, the solid portion was collected by hot filtration. 500 ml of titanium tetrachloride were added to the obtained solid portion. The mixture was allowed to react at 120° C. while stirring, and then hot filtration was again conducted to collect the obtained solid portion. The collected solid portion was washed 7 times with 1 liter of hexane at 60° C., and 3 times with 1 liter of hexane at room temperature.

(2) Preparation of $TiCl_4[C_6H_4(COO.i-C_4H_9)_2]$ 27.8 g of diisobutyl phthalate were added dropwise to a solution of 19 g of titanium tetrachloride in 1 liter of hexane over 30 minutes, while the temperature of the mixture was maintained at 0° C. After the addition was finished, the mixture was heated to 40 ° C., and was allowed to react for 30 minutes. When the reaction was completed, the solid portion was collected and washed 5 times with 500 ml of hexane, and thus the desired product was obtained.

(3) Preparation of catalytic composition for polymerization 20 g of the solid catalyst obtained in (1) above were suspended in 300 ml of toluene, and were treated for 1 hour with 5.2 g of $TiCl_4[C_6H_4(COO.i-C_4H_9)_2]$ obtained in (2) above, so as to support the catalyst. When this treatment for supporting the catalyst was completed, the solid portion was collected by hot filtration, and was suspended again in a mixture of 300 ml of toluene and 10 ml of titanium tetrachloride, in which the solid portion was washed by stirring at 90° C. for 1 hour. After collecting the solid portion, it was washed 5 times with 500 ml of toluene at 90° C. and 3 times with 500 ml of hexane at room temperature.

Prepolymerization

In nitrogen atmosphere, 500 ml of n-heptane, 6.0 g of triethylaluminium, 3.9 g of dicyclopentyldimethoxysilane, and 10 g of the catalytic composition for polymerization obtained in (3) above were put in an autoclave having a volume of 3 liters, and stirred for 5 minutes at a temperature in the range of 0°~5° C. Next, a propylene was supplied into the autoclave in such an amount that 10 g of the propylene would be polymerized for each 1 g of the catalytic composition for polymerization. Prepolymerization was then carried out at a temperature range of 0°~5° C. for 1 hour. The obtained prepolymerized solid catalytic composition was washed 3 times with 500 ml of n-heptane, and was used in the main polymerization below.

Main polymerization (4) First Step Polymerization: in nitrogen atmosphere, 2.0 g of the prepolymerized solid catalytic composition prepared by the above method, 11.4 g of triethylaluminium, and 6.84 g of dicyclopentyldimethoxysilane were put in an autoclave with a stirring device having a volume of 60 liters. Next, hydrogen was charged into 18 kg of propylene, so that the quantity of hydrogen became 13000 ppm by mole in respect to the propylene, the autoclave was heated to 75° C., and polymerization was carried out for 1 hour. The unreacted propylene was removed thereafter, and thus the polymerization was terminated. After the reaction was completed, the reaction products were sampled.

(5) Second Step Polymerization: after the first step polymerization was completed, the liquid propylene was removed, then, at a temperature of 75° C., hydrogen was added at a rate of 20 $Nm^3$/hour for 40 minutes and a gas combination of ethylene/propylene (in a molar ratio of 40/60) was added at a rate of 2.2 $Nm^3$/hour, and copolymerized. The unreacted gas was removed, and thus the polymerization was terminated. As a result, 8.0 kg of a propylene-ethylene block copolymer (hereinafter referred to as BPP1) with an ethylene content of 9.7% by weight and an MFR of 0.8 g/10 minutes was obtained.

In addition, for the second step polymerization, a propylene-ethylene block copolymer (hereinafter referred to as BPP2) with an ethylene content of 8.4% by weight, a butene-1 content of 0.7% by weight, and an MFR of 1.1 g/10 minutes was obtained in the same way, except for the addition of butene-1, as BPP1.

In addition, another BPP was prepared according to the following and used as a comparative example.

Polymerization was conducted in the same way as the polymerization for BPP1 above by charging hydrogen into 18 kg of propylene, so that the quantity of hydrogen was 8000 ppm by mole in respect to the propylene, and the temperature raised to 70° C., and using as catalytic components 6.6 g of titanium trichloride of AA-type manufactured by TOSOH AKZO CO., and 23.5 g of diethylaluminium chloride. As a result a propylene block copolymer (hereinafter referred to as BPP3) with an ethylene content of 9.8% by weight and MFR of 0.8 g/10 minutes was obtained.

With regard to the above-mentioned polypropylene portion sampled after the first step polymerization, XI, IP, N, and $N_f$ were measured. The results are shown in Table 3.

The conditions for the measurement of IP are shown below:

Measuring device: JNM-GSX400 manufactured by JEOL LTD.

Measuring mode: proton decoupling method

Pulse width: 8.0 $\mu s$

Pulse repetition time: 5.0 s

Cumulative number of repetitions: 20000 times

Solvent: a mixture of 1,2,4-trichlorobenzene and benzene deuteride (75/25% by weight)

Internal Circulation: hexamethyldisiloxane

Sample concentration: 300 mg/3.0 ml solvent

Measuring temperature: 120° C.

TABLE 3

| | BPP Polyproplene Portion (a) | | | |
|---|---|---|---|---|
| BPP Type | XI (% by weight) | IP (%) | N (-) | $N_f \geq 300$ (% by weight) |
| BPP1 | 99.5 | 99.5 | 816 | 82 |
| BPP2 | 99.4 | 99.3 | 592 | 68 |
| BPP3 | 98.5 | 97.7 | 211 | 1 or less |

In addition, with respect to the ethylene-propylene copolymer portion, FP, PP, $P_{fl}$, and CSD were obtained from NMR spectrum and two-site model analysis. The results are shown in Table 4.

TABLE 4

| BPP Type | BPP Copolymer Portion (b) | | | |
|---|---|---|---|---|
| | FP (% by mole) | $P_p$ (% by mole) | $P_{fl}$ (–) | CSD (–) |
| BPP1 | 51 | 75.4 | 0.54 | 3.57 |
| BPP2 | 53 | 76.5 | 0.61 | 3.46 |
| BPP3 | 52 | 62.1 | 0.75 | 1.77 |

TABLE 5

| Polyolefin Type | $\eta_1/\eta_2$ (–) | Tmp (°C.) | Tcp (°C.) | Tmp/Tcp (–) | Tmp/(Tmp – Tcp) (–) | a-Axis Orientation (–) |
|---|---|---|---|---|---|---|
| PO1 | 8.2 | 159.1 | 123.4 | 1.29 | 4.44 | oriented |
| PO2 | 10.2 | 159.3 | 123.9 | 1.29 | 4.50 | oriented |
| PO3 | 7.1 | 134.3 | 116.3 | 1.15 | 7.46 | oriented |
| PO4 | 2.1 | 161.3 | 107.1 | 1.51 | 2.98 | not oriented |
| PO5 | 3.0 | 130.5 | 109.7 | 1.19 | 6.27 | not oriented |

As the polyolefin resin of component (B), a polyolefin resin (hereinafter referred to as PO1) prepared by putting a polypropylene powder having an MFR of 0.6 g/10 minutes into a multilayered film bag (a copolymer of polyethylene and ethylene-vinyl alcohol) and air replaced with nitrogen, then treated with radiation at an exposure of 5 Mrad using an electron beam radiation device (manufactured by NISSHIN High Voltage Co.), and heat-treated at 130° C. for 60 minutes; a polypropylene (hereinafter referred to as PO2) having an MFR of 2.8 g/10 minutes and polymerized using δ titanium trichloride catalyst; and a polyethylene (hereinafter referred to as PO3) having an MFR of 1.5 g/10 minutes (measured at a temperature of 190° C. and a load of 2.16 kg) and polymerized using chromium trichloride catalyst were used.

For comparison, a polypropylene (hereinafter referred to as PO4) having an MFR of 2.9 g/10 minutes and polymerized using titanium trichloride catalyst; and a polyethylene (hereinafter referred to as PO5) having an MFR of 1.7 g/10 minutes polymerized using a catalyst carrying magnesium trichloride were used.

Table 5 shows the kinematic viscosity ratio ($\eta_1/\eta_2$), Tmp, Tcp, Tmp/(Tmp-Tcp), and whether or not each of the above resins has an a-axis orientation.

Moreover, the complex viscosity ratio was measured in accordance with ASTM D4065-90 and ASTM D4440-84 using a Mechanical Spectrometer, Model RMS-800, produced by Rheometric Co., Ltd. The crystallization temperature and melting temperature were measured using a DSC measuring device (7Series Thermal Analysis System) produced by Perkin-Elmer Co. The a-axis orientation was measured by means of a diffraction pattern recorded with a wide angle X ray flat camera, under conditions of 50 KV and 40 mA with a point focus, by irradiation for 1 hour using an X ray diffraction device (RAD-II), produced by RIGAKU CO.

In addition, as component (C), precipitated calcium carbonate (Stavigot-15A average size: 0.15 μm, produced by SHIRAISHI CALCIUM KAISHA, LTD., CALSHITEC) (hereinafter referred to as PCC) surface treated with unsaturated fatty acid; hydrated silicic acid (Finesil, average particle size: 0.05 μm, produced by TOKUYAMA CO.) (hereinafter referred to as SA); and hydrated calcium silicate (graded FLOWLITE, average particle size: 4.0 μm, from TOKUYAMA CO.) (hereinafter referred to as CS) were used.

As component (D), talc (MION WHITE #5000S, average particle size: 2.8 μm, produced by HAYASHI KASEI CO., LTD.), mica (SUZOLITE, average particle size 20 μm, from Marietta Co. of the U.S.) and calcium titanate (TISMO, fiber diameter: 0.2~0.5 μm, fiber length: 10~20 μm, produced by OHTSUKA Co.) (hereinafter referred to as CT).

Examples 1~12, and Comparative Examples 1~7

For each Example and Comparative Example, a BPP, a polyolefin resin, and two inorganic fillers, the types and the amounts of which are shown in Table 6, and as stabilizers, 0.05 parts by weight of di-t-butyl-p-cresol, 0.10 parts by weight of pentaerythrityl tetrakis[3-(3,5-di-t-butyl-4-hydroxyphenyl)propionate, and 0.10 parts by weight of calcium stearate were mixed using a Supermixer (model SMV20) manufactured by KAWATA MFG. CO., LTD., and the mixture was pelletized using a biaxial extruder (model AS30) manufactured by NAKATANI MACHINE CO., LTD). Each pellet obtained was made into a test piece using an injection molding machine manufactured by TOSHIBA MACHINE CO., LTD., at 220° C., with a mold cooling temperature of 50° C. After leaving the obtained test piece in a thermostatic chamber for 2 days at a temperature of 23° C. with a relative humidity of 50%, flexural modulus, Izod impact strength (using the test piece with a notch), and scratch resistance were measured. For moldability, each pellet was made into sheets of 0.5 mm thickness using an extruder with a 600 mm wide T-die, and the sheets evaluated. The results obtained are shown in Table 7.

TABLE 6

| | Component (A) | | Component (B) | | Component (C) | | Component (D) | |
|---|---|---|---|---|---|---|---|---|
| | Type | Amount Added (parts by weight) | Type | Amount Added (parts by weight) | Type | Amount Added (parts by weight) | Type | Amount Added (parts by weight) |
| Example 1 | BPP1 | 56 | PO1 | 11 | PCC | 25 | talc | 8 |
| Example 2 | " | 65 | PO2 | 12 | " | 15 | " | 8 |
| Example 3 | " | 65 | PO3 | 12 | " | 15 | " | 8 |
| Example 4 | BPP2 | 65 | PO1 | 12 | " | 15 | " | 8 |
| Example 5 | BPP1 | 65 | " | 12 | " | 15 | mica | 8 |
| Example 6 | " | 65 | " | 12 | " | 15 | PT | 8 |
| Example 7 | " | 65 | " | 12 | SA | 15 | talc | 8 |
| Example 8 | " | 65 | " | 12 | " | 15 | mica | 8 |
| Example 9 | " | 65 | " | 12 | " | 15 | PT | 8 |

TABLE 6-continued

|  | Component (A) | | Component (B) | | Component (C) | | Component (D) | |
| --- | --- | --- | --- | --- | --- | --- | --- | --- |
|  | Type | Amount Added (parts by weight) | Type | Amount Added (parts by weight) | Type | Amount Added (parts by weight) | Type | Amount Added (parts by weight) |
| Example 10 | " | 65 | " | 12 | CS | 15 | talc | 8 |
| Example 11 | " | 65 | " | 12 | " | 15 | mica | 8 |
| Example 12 | " | 65 | " | 12 | " | 15 | PT | 8 |
| Comparative Example 1 | BPP3 | 65 | PO1 | 12 | PCC | 15 | talc | 8 |
| Comparative Example 2 | BPP1 | 77 | — | 0 | " | 15 | " | 8 |
| Comparative Example 3 | " | 52 | PO1 | 25 | " | 15 | " | 8 |
| Comparative Example 4 | " | 65 | PO3 | 12 | " | 15 | " | 8 |
| Comparative Example 5 | " | 65 | PO5 | 12 | " | 15 | " | 8 |
| Comparative Example 6 | " | 65 | PO1 | 12 | " | 0 | " | 23 |
| Comparative Example 7 | " | 65 | " | 12 | PCC | 23 | — | 0 |

TABLE 7

|  | Flexural Modulus (kg/cm²) | Izod Impact Strength (kg · cm/cm) | | Smallest Scratching Load (g) | Moldability | |
| --- | --- | --- | --- | --- | --- | --- |
|  |  | 23° C. | -20° C. |  | Shape Maintenance Time (sec) | Uniform Spreadability |
| Example 1 | 31300 | N.B | 4.1 | 240 | 24 | good |
| Example 2 | 28600 | " | 4.6 | 220 | 38 | " |
| Example 3 | 28000 | " | 4.1 | 200 | 29 | " |
| Example 4 | 28600 | " | 4.4 | 220 | 36 | " |
| Example 5 | 28300 | " | 4.3 | 230 | 35 | " |
| Example 6 | 29400 | " | 4.0 | 240 | 31 | " |
| Example 7 | 28700 | " | 4.1 | 230 | 36 | " |
| Example 8 | 28200 | " | 4.2 | 220 | 35 | " |
| Example 9 | 29100 | " | 4.0 | 240 | 30 | " |
| Example 10 | 28000 | " | 4.0 | 220 | 34 | " |
| Example 11 | 28000 | " | 4.1 | 220 | 33 | " |
| Example 12 | 29300 | " | 4.0 | 240 | 30 | " |
| Comparative Example 1 | 24600 | N.B | 4.5 | 180 | 27 | good |
| Comparative Example 2 | 30200 | " | 4.5 | 230 | could not be vacuum-molded | could not be vacuum-molded |
| Comparative Example 3 | 26800 | " | 4.7 | 170 | 55 | poor |
| Comparative Example 4 | 33400 | 28.2 | 2.5 | 260 | 36 | good |
| Comparative Example 5 | 21200 | N.B | 5.5 | 50 | 39 | poor |
| Comparative Example 6 | 28500 | " | 4.5 | 210 | 10 | " |
| Comparative Example 7 | 28800 | 32.5 | 3.1 | 210 | 36 | good |

N.B: did not break

B. Resin which used PP as Component (A)

The measuring method for each property is the same as for A above.

The PP used is a polypropylene (hereinafter referred to as PP1) obtained by means of the same operation as the prepolymerization of A, using the same solid catalyst as that used in the manufacture of the BPP of A, and followed by main polymerization by means of the same operation as that for the first step polymerization of the polymerization of A. The MFR of PP1 is 0.7 g/10 minutes.

In addition, as a comparative example, a polypropylene (hereinafter referred to as PP2) was used, which was obtained by polymerization in the same way as PP1 below, wherein 18 kg of propylene was charged with hydrogen so that the hydrogen was 8000 ppm by mole in respect of the propylene, the temperature raised to 70° C., and 23.5 g of diethylaluminium chloride and 6.0 g of titanium trichloride of AA-type (manufactured by TOSOH AKZO CO.) were used as catalytic components. The MFR of PP2 was 0.8 g/10 minutes.

With regard to the above-mentioned PP, XI, IP, N, and $N_f$ were measured. The results are shown in Table 8. The conditions for the measurement of IP are the same as for A above.

TABLE 8

| PP Type | XI (% by weight) | IP (%) | N (-) | Proportion of Nf ≧ 300 (% by weight) |
|---|---|---|---|---|
| PP1 | 99.5 | 99.5 | 715 | 100 |
| PP2 | 98.3 | 96.9 | 72 | 1 or less |

As the polyolefin resin of component (B), PO1~PO3 used in A above were used. In addition, as a comparative example, PO4 and PO5 used in A above were used.

As the inorganic fillers of components (C) and (D), the same inorganic fillers used in A above were used.

In addition, as rubber polymer (E), an ethylene-propylene rubber (hereinafter referred to as RB1) with a propylene content of 32% by weight, a hydrogenated ethylene-butadiene rubber (hereinafter referred to as RB2) with a butadiene content of 19% by weight, a styrene-ethylene/butene-styrene block copolymer (TUFTEC HI 051 produced by Asahi Chemical Industry Co., Ltd.) (hereinafter referred to as RB3), and hydrogenated styrene-ethylene/isoprene-styrene block copolymer (Septon 2023 produced by Kuraray, Co., Ltd.) (hereinafter referred to as RB4) were used.

Examples 13~26, and Comparative examples 8~16

For each Example and Comparative Example, a PP, a polyolefin resin, two types of inorganic fillers, and a stabilizer, the same as the stabilizer used in example A, were mixed in the same parts by weight and using the same method as in example A, and pelletized. Using the obtained pellets test pieces and sheets are made in the same way as example A, and each property is measured. The obtained results are shown in Table 10.

TABLE 9

|  | Component (A) | | Component (B) | | Component (C) | | Component (D) | | Component (E) | |
|---|---|---|---|---|---|---|---|---|---|---|
|  | Type | Amount Added (parts by weight) | Type | Amount Added (parts by weight) | Type | Amount Added (parts by weight) | Type | Amount Added (parts by weight) | Type | Amount Added (parts by weight) |
| Example 13 | PP1 | 58 | PO1 | 12 | PCC | 15 | talc | 8 | RB1 | 7 |
| Example 14 | " | 58 | PO2 | 12 | " | 15 | " | 8 | " | 7 |
| Example 15 | " | 58 | PO3 | 12 | " | 15 | " | 8 | " | 7 |
| Example 16 | " | 58 | PO1 | 12 | " | 15 | " | 8 | RB2 | 7 |
| Example 17 | " | 58 | " | 12 | " | 15 | " | 8 | RB3 | 7 |
| Example 18 | " | 58 | " | 12 | " | 15 | " | 8 | RB4 | 7 |
| Example 19 | " | 58 | " | 12 | " | 15 | mica | 8 | RB1 | 7 |
| Example 20 | " | 58 | " | 12 | " | 15 | PT | 8 | " | 7 |
| Example 21 | " | 58 | " | 12 | SA | 15 | talc | 8 | " | 7 |
| Example 22 | " | 58 | " | 12 | " | 15 | mica | 8 | " | 7 |
| Example 23 | " | 58 | " | 12 | " | 15 | PT | 8 | " | 7 |
| Example 24 | " | 58 | " | 12 | CS | 15 | talc | 8 | " | 7 |
| Example 25 | " | 58 | " | 12 | " | 15 | mica | 8 | " | 7 |
| Example 26 | " | 58 | " | 12 | " | 15 | PT | 8 | " | 7 |
| Comparative Example 8 | PP2 | 58 | PO1 | 12 | PCC | 15 | talc | 8 | RB1 | 7 |
| Comparative Example 9 | PP1 | 70 | — | 0 | " | 15 | " | 8 | " | 7 |
| Comparative Example 10 | " | 45 | PO1 | 25 | " | 15 | " | 8 | " | 7 |
| Comparative Example 11 | " | 65 | " | 12 | " | 15 | " | 8 | — | 0 |
| Comparative Example 12 | " | 48 | " | 12 | " | 15 | " | 8 | RB1 | 17 |
| Comparative Example 13 | " | 58 | PO4 | 12 | " | 15 | " | 8 | " | 7 |
| Comparative Example 14 | " | 58 | PO5 | 12 | " | 15 | " | 8 | " | 7 |
| Comparative Example 15 | " | 58 | PO1 | 12 | " | 0 | " | 23 | " | 7 |
| Comparative Example 16 | " | 58 | " | 12 | PCC | 23 | — | 0 | " | 7 |

TABLE 10

|  | Flexural Modulus (kg/cm$^2$) | Izod Impact Strength (kg · cm/cm) | | Smallest Scratch Load (g) | Moldability | |
|---|---|---|---|---|---|---|
|  |  | 23° C. | −20° C. |  | Shape Maintenance Time (sec) | Uniform Spread-ability |
| Example 13 | 28800 | N.B | 4.5 | 230 | 35 | good |
| Example 14 | 28600 | " | 4.6 | 220 | 37 | " |
| Example 15 | 28000 | " | 4.2 | 200 | 29 | " |
| Example 16 | 28500 | " | 4.4 | 220 | 36 | " |
| Example 17 | 28300 | " | 4.6 | 220 | 35 | " |
| Example 18 | 28400 | " | 4.4 | 230 | 33 | " |

TABLE 10-continued

|  | Flexural Modulus (kg/cm²) | Izod Impact Strength (kg·cm/cm) 23° C. | Izod Impact Strength (kg·cm/cm) −20° C. | Smallest Scratch Load (g) | Moldability Shape Maintenance Time (sec) | Moldability Uniform Spreadability |
|---|---|---|---|---|---|---|
| Example 19 | 28400 | " | 4.3 | 230 | 35 | " |
| Example 20 | 29400 | " | 4.0 | 240 | 31 | " |
| Example 21 | 28700 | " | 4.1 | 230 | 36 | " |
| Example 22 | 28200 | " | 4.2 | 220 | 35 | " |
| Example 23 | 29200 | " | 4.0 | 240 | 30 | " |
| Example 24 | 28100 | " | 4.0 | 220 | 34 | " |
| Example 25 | 28000 | " | 4.1 | 220 | 33 | " |
| Example 26 | 29400 | " | 4.0 | 240 | 30 | " |
| Comparative Example 8 | 24700 | N.B | 4.6 | 180 | 37 | good |
| Comparative Example 9 | 30200 | " | 4.5 | 230 | could not be vacuum-molded | could not be vacuum-molded |
| Comparative Example 10 | 26800 | " | 4.6 | 170 | 52 | poor |
| Comparative Example 11 | 33400 | 27.9 | 2.6 | 260 | 36 | good |
| Comparative Example 12 | 21200 | N.B | 5.5 | 55 | 39 | " |
| Comparative Example 13 | 28500 | " | 4.7 | 230 | 14 | poor |
| Comparative Example 14 | 28300 | " | 4.5 | 200 | 12 | " |
| Comparative Example 15 | 37600 | 7.5 | 2.4 | 230 | 34 | " |
| Comparative Example 16 | 24100 | N.B | 4.7 | 220 | 36 | good |

N.B: did not break

C. Propylene Resin Laminate

The method used to measure each property is the same as the method used in A above, with the exception of the following properties.

Flexural Modulus

Flexural modulus was measured using Layer I as the surface.

Izod Impact Strength

Izod impact strength was measured at a temperature of −20° C. with Layer I of the test piece having a notch.

Scratch Resistance

Scratch resistance is measured using a test piece of 2 mm thickness. The vertical load is applied to Layer I.

Shape Maintenance Time

When the laminated sheet is put in the oven, Layer I is on the upside.

As the polypropylene of Layer I, PP3 and PP5, which will be explained later were used.

As a dibenzylidenesorbitol derivative, 1,3,2,4-di(p-methylbenzylidene)sorbitol (Gell All MDR, produced by NEW JAPAN CHEMICAL CO., LTD.) was used.

In addition, the BPP used in Layer II was manufactured in the following way.

By means of the same operation used to obtain BPP1 which was used in A, 8.0 kg of a propylene-ethylene block copolymer (hereinafter referred to as BPP4) with an ethylene content of 9.7% by weight and an MFR of 0.8 g/10 minutes was obtained.

In addition, by means of the same operation used to obtain the BPP2 which was used for A, a propylene-ethylene block copolymer (hereinafter referred to as EPP5) with an ethylene content of 8.4% by weight, a 1-butene content of 0.7% by weight, and an MFR of 1.1 g/10 minutes was obtained.

In addition, for comparison, by means of the same operation used to obtain BPP3 which was used in A, a propylene block copolymer (hereinafter referred to as BPP6) with an ethylene content of 9.8% by weight, and an MFR of 0.8 g/10 minutes was obtained.

With regard to the polypropylene which was sampled after the first step polymerization of the above-mentioned BPPs was finished, XI, IP, N, and $N_f$ were measured. The results are shown in Table 11. The measuring conditions for IP were the same as those used in A above.

In addition, for each ethylene-propylene copolymer obtained by means of the second step, FP, $P_P$, $P_{fl}$ and CSD were calculated in accordance with NMR and two-site model analysis. These results are shown in Table 11.

In addition, as the PP employed as component (A) in place of BPP, a polypropylene (hereinafter referred to as PP3) with an MFR of 3.7 g/10 minutes, and a polypropylene (hereinafter referred to as PP4) with an MFR of 0.8 g/10 minutes, polymerized using the solid catalyst used for the above-mentioned BPP, were used.

For comparison, a polypropylene (hereinafter referred to as PP5) with an MFR of 3.9 g/10 minutes, obtained by polymerization using diethylaluminium chloride as a catalytic component, and a polypropylene (hereinafter referred to as PP6) with an MFR of 3.9 g/10 minutes, polymerized using a catalyst obtained using only operation (i) from the manufacture of the catalyst used in the above-mentioned BPP, were used.

With regard to the above-mentioned PPs, XI, IP, N, and $N_f$ were measured. The results are shown in Table 11. The measuring conditions were the same as those mentioned-above.

TABLE 11

| BPP or PP type | Polypropylene portion | | | | Ethylene-Propylene Copolymer portion | | | |
|---|---|---|---|---|---|---|---|---|
| | XI (% by weight) | IP (%) | N (-) | Proportion of $N_f \geq 300$ (% by weight) | FP (% by mole) | $P_p$ (% by mole) | $P_{fl}$ (-) | CSD (-) |
| BPP4 | 99.5 | 99.5 | 715 | 100 | 51 | 75.4 | 0.54 | 3.57 |
| BPP5 | 99.5 | 99.6 | 716 | 100 | 53 | 76.5 | 0.61 | 3.46 |
| BPP6 | 98.3 | 97.5 | 160 | 1 or less | 52 | 62.1 | 0.75 | 1.77 |
| PP3 | 99.5 | 99.5 | 715 | 100 | | | | |
| PP4 | 99.5 | 99.6 | 716 | 100 | | | | |
| PP5 | 98.1 | 96.5 | 70 | 1 or less | | | | |
| PP6 | 98.3 | 96.9 | 72 | 1 or less | | | | |

As the polyolefin for component (B), PO1~PO3, used in A and B above, were used. In addition, for comparison, PO4 and PO5, used in A and B above, were used.

As the inorganic fillers for components (C) and (D), the same organic fillers used in A and B above were used.

In addition, as rubber polymers for component (E), RB1~RB4, used in B above, were used.

Examples 27~46, and Comparative Examples 17~32

For each Example and Comparative Example, each component of Layer I, the type and the amount of which are shown in Tables 12 and 13, and, as stabilizers, 0.05 parts by weight of di-t-butyl-p-cresol, 0.10 parts by weight of pentaerythrityl tetrakis[3-(3,5-di-t-butyl-4-hydroxyphenyl) propionate, and 0.10 parts by weight of calcium stearate were combined. In the same way, each component of Layer II and the above-mentioned stabilizers and a nucleating agent (ADEKASTAB NA-10, produced by Asahi Denka Kogyo Co., Ltd.) were combined. Then, they were mixed using a Supermixer (model SMV20) manufactured by KAWATA MFG. CO., LTD., and the mixture was pelletized using a biaxial extruder (model AS30) manufactured by NAKATANI MACHINE CO., LTD).

The pellets for Layer I are formed into a film of 100 μm thickness by means of an extrusion forming machine. In addition pellets for Layer II are made into test pieces using an injection molding machine manufactured by TOSHIBA MACHINE CO., LTD. (IS-170FII), at 220° C., with a mold cooling temperature of 50° C. To this, the above-mentioned layer A film was laminated using dry-laminate adhesive (2K-LF-302A manufactured by Dainippon Ink and Chemicals, Inc.). After leaving the obtained laminated test pieces in a thermostatic chamber for 2 days at a temperature of 23° C. with a relative humidity of 50%, flexural modulus, Izod impact strength (using the test piece with a notch) were measured. A pellet of Layer I and a pellet of Layer II were co-extruded into a laminated sheet of 1 mm thickness (the thickness of Layer I was 100 μgm) at a temperature of 230° C. using an extruder with a 600 mm wide T-die. This laminated sheet was evaluated for scratch resistance. In addition the said laminated sheet was formed into a container (size of opening: 300 mm×200 mm, size of bottom: 280 mm×180 mm, depth: 100 mm, thickness: 0.5 mm) by means of vacuum forming, and moldability evaluated.

In addition, the gloss of the central portion of the inner surface of the bottom of said vessel (an unmolded surface) was measured. The results of the above are shown in Table 14.

TABLE 12

| Example or Comparative Example Number | Layer I | | | Layer II | | | | | | | |
|---|---|---|---|---|---|---|---|---|---|---|---|
| | Polypropylene | | Sorbitol Derivative | BPP (A) | | Polyolefin Resin (B) | | Inorganic Filler (C) | | Inorganic Filler (D) | |
| | Type | Proportion Added (% by weight) | Proportion Added (% by weight) | Type | Amount Added (% by weight) | Type | Amount Added (% by (weight) | Type | Amount Added (% by weight) | Type | Amount Added (% by weight) |
| Example 27 | PP3 | 99.8 | 0.2 | BPP4 | 64 | PO1 | 15 | PCC | 15 | talc | 6 |
| Example 28 | " | " | " | " | " | PO3 | " | " | " | " | " |
| Example 29 | " | " | " | " | " | PO2 | " | " | " | " | " |
| Example 30 | " | " | " | BPP5 | " | PO1 | " | " | " | " | " |
| Example 31 | " | " | " | BPP4 | " | " | " | SA | " | " | " |
| Example 32 | " | " | " | " | " | " | " | CS | " | " | " |
| Example 33 | " | " | " | " | " | " | " | PCC | " | mica | " |
| Example 34 | PP5 | " | " | " | " | " | " | SA | " | " | " |
| Example 35 | " | " | " | BPP4 | " | " | " | CS | " | " | " |
| Example 36 | PP3 | " | " | " | " | " | " | PCC | " | PT | " |
| Example 37 | " | " | " | " | " | " | " | SA | " | " | " |
| Example 38 | " | " | " | " | " | " | " | CS | " | " | " |
| Comparative Example 17 | PP3 | 100 | 0 | BPP4 | 64 | PO1 | 15 | PCC | 15 | talc | 6 |
| Comparative Example 18 | " | 99.8 | 0.2 | BPP6 | " | " | " | " | " | " | " |
| Comparative | " | " | " | BPP4 | " | PO4 | " | " | " | " | " |

TABLE 12-continued

| Example or Comparative Example Number | Layer I Polypropylene Type | Layer I Polypropylene Proportion Added (% by weight) | Sorbitol Derivative Proportion Added (% by weight) | Layer II BPP (A) Type | Layer II BPP (A) Amount Added (% by weight) | Polyolefin Resin (B) Type | Polyolefin Resin (B) Amount Added (% by (weight) | Inorganic Filler (C) Type | Inorganic Filler (C) Amount Added (% by weight) | Inorganic Filler (D) Type | Inorganic Filler (D) Amount Added (% by weight) |
|---|---|---|---|---|---|---|---|---|---|---|---|
| Example 19 Comparative Example 20 | " | " | " | " | " | PO5 | " | " | " | " | " |
| Comparative Example 21 | " | " | " | " | 40 | PO1 | 39 | " | " | " | " |
| Comparative Example 22 | " | " | " | " | 76 | " | 3 | " | " | " | " |
| Comparative Example 23 | " | " | " | " | 59 | " | 12 | " | 3 | " | 26 |
| Comparative Example 24 | " | " | " | " | 55 | " | 10 | " | 35 | — | 0 |

TABLE 13

| Example or Comparative Example Number | Layer I Polypropylene Type | Layer I Polypropylene Proportion Added (% by weight) | Sorbitol Derivative Proportion Added (% by weight) | Layer II PP (A) Type | Layer II PP (A) Proportion Added (% by weight) | Polyolefin Resin (B) Type | Polyolefin Resin (B) Proportion Added (% by weight) | Inorganic Filler (C) Type | Inorganic Filler (C) Proportion Added (% by weight) | Inorganic Filler (D) Type | Inorganic Filler (D) Proportion Added (% by weight) | Rubber Copolymer (E) Type | Rubber Copolymer (E) Proportion Added (% by weight) |
|---|---|---|---|---|---|---|---|---|---|---|---|---|---|
| Example 39 | PP3 | 99.8 | 0.2 | PP3 | 57 | PO1 | 15 | PCC | 15 | talc | 6 | RB1 | 7 |
| Example 40 | " | " | " | " | " | PO3 | " | " | " | " | " | " | " |
| Example 41 | " | " | " | " | " | PO2 | " | " | " | " | " | " | " |
| Example 42 | " | " | " | " | " | PO1 | " | " | " | " | " | RB2 | " |
| Example 43 | " | " | " | " | " | " | " | " | " | " | " | RB3 | " |
| Example 44 | PP5 | " | " | " | " | " | " | " | " | " | " | RB4 | " |
| Example 45 | " | " | " | PP4 | " | " | " | SA | " | mica | " | RB1 | " |
| Example 46 | PP3 | " | " | " | " | " | " | CS | " | PT | " | " | " |
| Comparative Example 25 | PP3 | 99.8 | 0.2 | PP5 | 57 | PO1 | 15 | PCC | 15 | talc | 6 | RB1 | 7 |
| Comparative Example 26 | " | " | " | PP6 | " | " | " | " | " | " | " | " | " |
| Comparative Example 27 | " | " | " | PP3 | " | PO4 | " | " | " | " | " | " | " |
| Comparative Example 28 | " | " | " | " | " | PO5 | " | " | " | " | " | " | " |
| Comparative Example 29 | " | " | " | " | 69 | PO1 | 3 | " | " | " | " | " | " |
| Comparative Example 30 | " | " | " | " | 40 | " | 32 | " | " | " | " | " | " |
| Comparative Example 31 | " | " | " | " | 62 | " | 15 | " | " | " | " | " | 2 |
| Comparative Example 32 | " | " | " | " | 47 | " | " | " | " | " | " | " | 17 |

TABLE 14

| Example and Comparative Example Numbers | Flexural Modulus (kg/cm$^2$) | Izod Impact Strength (test piece with notch) −20° C. (kg · cm/cm) | Smallest Scratching Load (g) | Moldability Shape Maintaining Time (sec) | Moldability Uniform Spreadability (−) | Gloss (%) |
|---|---|---|---|---|---|---|
| Example 27 | 28900 | 4.5 | 290 | 39 | good | 84 |
| Example 28 | 28600 | 4.4 | 280 | 34 | " | 83 |
| Example 29 | 28400 | 4.5 | 280 | 31 | " | 84 |
| Example 30 | 28300 | 4.7 | 290 | 39 | " | 82 |

TABLE 14-continued

| Example and Comparative Example Numbers | Flexural Modulus (kg/cm²) | Izod Impact Strength (test piece with notch) −20° C. (kg · cm/cm) | Smallest Scratching Load (g) | Moldability Shape Maintaining Time (sec) | Uniform Spread-ability (—) | Gloss (%) |
|---|---|---|---|---|---|---|
| Example 31 | 26900 | 4.2 | 280 | 36 | " | 84 |
| Example 32 | 26800 | 4.3 | 280 | 35 | " | 82 |
| Example 33 | 28300 | 4.4 | 270 | 36 | " | 84 |
| Example 34 | 28600 | 4.2 | 240 | 36 | " | 82 |
| Example 35 | 28500 | 4.3 | 250 | 37 | " | 78 |
| Example 36 | 29100 | 4.1 | 290 | 32 | " | 72 |
| Example 37 | 29000 | 4.0 | 270 | 31 | " | 80 |
| Example 38 | 28700 | 4.1 | 270 | 32 | " | 81 |
| Example 39 | 28800 | 4.5 | 290 | 39 | " | 84 |
| Example 40 | 28600 | 4.6 | 280 | 38 | " | 82 |
| Example 41 | 26900 | 4.7 | 280 | 33 | " | 83 |
| Example 42 | 28400 | 4.7 | 290 | 39 | " | 82 |
| Example 43 | 28500 | 4.7 | 280 | 38 | " | 83 |
| Example 44 | 28400 | 4.8 | 250 | 38 | " | 75 |
| Example 45 | 28600 | 4.2 | 250 | 36 | " | 73 |
| Example 46 | 28700 | 4.1 | 270 | 32 | " | 82 |
| Comparative Example 17 | 28100 | 4.5 | 240 | 38 | good | 13 |
| Comparative Example 18 | 25000 | 4.4 | 270 | 35 | " | 83 |
| Comparative Example 19 | 28300 | 4.3 | 270 | 13 | poor | 38 |
| Comparative Example 20 | 28200 | 4.4 | 280 | 12 | " | 39 |
| Comparative Example 21 | 28100 | 4.5 | 240 | 57 | " | 54 |
| Comparative Example 22 | 28900 | 4.4 | 280 | 9 | " | 42 |
| Comparative Example 23 | 37600 | 1.9 | 280 | 34 | good | 83 |
| Comparative Example 24 | 30200 | 3.6 | 270 | 26 | poor | 67 |
| Comparative Example 25 | 28600 | 4.5 | 280 | 37 | good | 52 |
| Comparative Example 26 | 25100 | 4.4 | 270 | 35 | " | 83 |
| Comparative Example 27 | 28300 | 4.3 | 270 | 13 | poor | 38 |
| Comparative Example 28 | 28200 | 4.4 | 280 | 12 | " | 39 |
| Comparative Example 29 | 28900 | 4.4 | 270 | 8 | " | 34 |
| Comparative Example 30 | 26900 | 4.4 | 280 | 56 | " | 42 |
| Comparative Example 31 | 37600 | 1.9 | 280 | 34 | good | 83 |
| Comparative Example 32 | 18100 | 8.4 | 260 | 34 | " | 81 |

What is claimed is:

1. A propylene resin composition comprising:

a composition containing polypropylene, 45~70 parts by weight, said composition containing polypropylene possessing:
   a portion insoluble in xylene at 25° C. by solvent extraction method of not less than 98.0% by weight;
   an isotactic pentad fraction of not less than 96.5% as determined by $^{13}$C-NMR;
   an isotactic average chain length of not less than 90 as determined by $^{13}$C-NMR; and
   a total amount of fractions each of which has an isotactic average chain length of not less than 300 as determined by $^{13}$C-NMR, according to a column fractionation method, of not less than 10% by weight;

a polyolefin resin selected from the group consisting of polyethylene resin and polypropylene resin, 5~20 parts by weight, possessing:
   a ratio of $\eta_1/\eta_2$ of 4~20, wherein $\eta_1$ is a complex viscosity at an angular frequency of $10^{-1}$ rad/sec at 190° C., and $\eta_2$ is a complex viscosity at an angular frequency of 10 rad/sec at 190° C.;
   Tcp of 110°~130° C., and Tmp/(Tmp-Tcp) of 3.0~9.8, wherein Tcp is crystallization peak temperature, and Tmp is melting peak temperature of said polyolefin resin, said Tcp and said Tmp measurements obtained by a differential scanning calorimetry method wherein, for polyethylene, Tcp is measured after raising a temperature of said polyethylene resin to 190° C. and maintaining the temperature for five minutes, then lowering said temperature at a rate of 10° C./minute until said temperature reaches 30° C. and Tmp is then measured by raising said temperature at rate of 10° C./minute to 190° C., and for polypropylene, Tcp is measured after raising a temperature of said polypropylene resin to 230° C. and maintaining the temperature for five minutes, then lowering said temperature at a rate of 20° C./minute until said temperature reaches 30° C., and Tmp is then measured by raising said temperature at rate of 20° C./minute to 230° C.; and a crystal structure of an a-axis orientation in a diffraction pattern according to an X-ray diffraction method;

at least one inorganic filler selected from the group consisting of precipitated calcium carbonate, hydrated silicic acid, and hydrated calcium silicate, 5~30 parts by weight; and at least one inorganic filler selected from the group consisting of talc, mica, and potassium titanate, 5~30 parts by weight.

2. A propylene resin composition according to claim 1, wherein said composition containing polypropylene is a propylene block copolymer obtained by sequential polymerization of:

a polypropylene portion, 50–97 parts by weight, possessing:
  a portion insoluble in xylene at 25° C. by solvent extraction method of not less than 98.0% by weight;
  an isotactic pentad fraction of less than 96.5% as determined by $^{13}$C-NMR;
  an isotactic average chain length of not less than 90 as determined by $^{13}$C-NMR; and
  a total amount of fractions each of which has an isotactic average chain length of not less than 300 as determined by $^{13}$C-NMR, according to a column fractionation method, of not less than 10% by weight; and a propylene-α-olefin portion, 50~3 parts by weight, possessing:
  an average propylene context of 20~80% by mole;
  a propylene context of 65~90% by mole wherein the propylene content is a calculated propylene content of copolymer generated at the active site where polymerization of propylene predominantly occurs according to a two-site model;
  a proportion, in said propylene-α-olefin copolymer, of said copolymer of 0.40~0.80, wherein the proportion is a calculated proportion of propylene-α-olefin copolymer generated at the active site where propylene polymerization predominates according to the two-site model; and
  a copolymer sequence distribution of 1.8~5.0.

3. A propylene resin composition according to claim 2, wherein said propylene block copolymer is obtained by:

treating a solid catalyst containing a magnesium compound, a titanium compound, a halogen containing compound, and an electron donative compound with a titanium compound of general formula $TiX_a \cdot Y_b$, wherein X is a halogen atom selected from the group consisting of Cl, Br, and I, Y is an electron donative compound, a is an integer of 3 or 4, and b is an integer of 3 or less;

washing said solid catalyst with a halogen-containing compound;

washing said solid catalyst with a hydrocarbon to form a washed catalyst; and sequentially polymerizing said propylene portion followed by said propylene-α-olefin portion in the presence of said washed catalyst to form said propylene block copolymer.

4. A propylene block copolymer according to claim 1, wherein said composition containing polypropylene is a propylene block copolymer obtained by sequential polymerization said propylene block copolymer comprising:

a polypropylene portion, 50~97 parts by weight, possessing:
  a portion insoluble in xylene at 25° C. by solvent extraction method of not less than 98.0% by weight;
  an isotactic pentad fraction of not less than 96.5% as determined by $^{13}$C-NMR;
  an isotactic average chain length of not less than 90 as determined by $^{13}$C-NMR; and
  a total amount of fractions each of which has an isotactic average chain length of not less than 300 as determined by $^{13}$C-NMR, according to a column fractionation method, of not less than 10% by weight; and a propylene-α-olefin portion, 50~3 parts by weight, which according to analysis of $^3$C-NMR spectra using a two-site model for polymerization is described by the following formulae:

$$20 \leq FP \leq 80$$

wherein FP is an average propylene content in mole %;

$$65 \leq P_P \leq 90$$

wherein $P_P$ is a calculated propylene content of the copolymer generated at an active site where polymerization of propylene predominantly occurs according to a two-site model; and $$0.40 \leq P_\beta \leq 0.86$$

wherein $P_\beta$ is a calculated proportion of copolymer generated at the active site where polymerization of propylene predominantly occurs;

said copolymer having a copolymer sequence distribution (CSD) of 1.8–5.0 wherein $CSD=(R4 \times R1)/(0.5 \times (R2+R3))^2$ where R1, R2, R3 and R4 are the intensity ratios of a nuclear magnetic resonance spectrum of an ethylene-propylene copolymer.

5. The propylene block copolymer according to claim 4, wherein $2.0 \leq CSD \leq 4.5$.

6. The propylene block copolymer according to claim 4, wherein $2.5 \leq CSD \leq 4.0$.

* * * * *